(12) United States Patent
Lin

(10) Patent No.: US 7,995,524 B2
(45) Date of Patent: Aug. 9, 2011

(54) WIRELESS COMMUNICATION SYSTEM AND METHOD

(75) Inventor: Tzu-Ming Lin, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 924 days.

(21) Appl. No.: 11/882,223

(22) Filed: Jul. 31, 2007

(65) Prior Publication Data

US 2008/0062904 A1 Mar. 13, 2008

Related U.S. Application Data

(60) Provisional application No. 60/842,675, filed on Sep. 7, 2006.

(51) Int. Cl.
*H04W 4/00* (2009.01)

(52) U.S. Cl. ........................................ 370/329; 370/401

(58) Field of Classification Search .......... 370/328–339, 370/400–401
See application file for complete search history.

(56) References Cited

U.S. PATENT DOCUMENTS

| | | | |
|---|---|---|---|
| 6,046,978 A | 4/2000 | Melnik | |
| 6,137,781 A | 10/2000 | Goto et al. | |
| 6,449,272 B1 * | 9/2002 | Chuah et al. | 370/389 |
| 6,667,974 B1 | 12/2003 | Shigeta | |
| 6,731,639 B1 | 5/2004 | Ors et al. | |
| 6,990,086 B1 | 1/2006 | Holur et al. | |
| 7,061,896 B2 | 6/2006 | Jabbari et al. | |
| 7,352,729 B2 | 4/2008 | Fujiwara et al. | |
| 2005/0201269 A1 * | 9/2005 | Shim et al. | 370/208 |
| 2006/0046643 A1 | 3/2006 | Izumikawa et al. | |
| 2007/0072604 A1 * | 3/2007 | Wang | 455/428 |
| 2007/0097945 A1 * | 5/2007 | Wang et al. | 370/349 |

FOREIGN PATENT DOCUMENTS

| | | |
|---|---|---|
| CN | 1442961 A | 9/2003 |
| EP | 1 480 387 A1 | 11/2004 |
| JP | 2003-516645 | 5/2003 |
| KR | 2007-0025835 | 3/2007 |
| WO | WO 96/01029 A1 | 1/1996 |

OTHER PUBLICATIONS

Notice of Office Action dated Jul. 21, 2009, for Korean Patent Application No. 10-2007-0088229, and English translation thereof (5 pages).

Extended European Search Report, including European Search Report and European Search Opinion, from the European Patent Office, mailed Feb. 5, 2010, for European Patent Application No. 09014329.8 (10 pages).

(Continued)

*Primary Examiner* — Frank Duong

(74) *Attorney, Agent, or Firm* — Finnegan, Henderson, Farabow, Garrett & Dunner, LLP

(57) ABSTRACT

A method for processing wireless data in a wireless communication network, the wireless communication network including a plurality of intermediary nodes and a plurality of destination devices. The method includes determining at least one transmission path to each of the plurality of intermediary nodes. The at least one transmission path includes data associated with every intermediary node along the at least one transmission path. The method also includes determining a transmission path identifier for each of the at least one transmission paths and sending transmission data to at least one destination device of the plurality of destination devices. The transmission data is sent based on at least one of the transmission path identifiers.

37 Claims, 14 Drawing Sheets

OTHER PUBLICATIONS

Broch et al., "The Dynamic Source Routing Protocol for Mobile Ad Hoc Networks," Internet Draft, MONARCH Project, Carnegie Mellon University, Mar. 13, 1998, retrieved from the internet at http://www.monarch.cs.rice.edu/internet-drafts/draft-ietf-manet-dsr-00.txt (42 pages).

Extended European Search Report, including European Search Report and European Search Opinion, from the European Patent Office, mailed Apr. 14, 2008, for European Patent Application No. 07253545.3 (8 pages).

Mitsuo Nohara, "Session #43 802.16 Relay TG Closing Report", IEEE 802.16 Session #43, Tel Aviv, Israel, May 11, 2006, pp. 1-17.

G-Q Wang et al., "Virtual BS and MMR-Cell Decomposition", IEEE 802.16 Session #44, San Diego, CA, Jul. 3, 2006, pp. 1-6.

Keiichi Nakatsugawa et al., "Additional Improvements for Synchronous MBS Transmission in MR", IEEE 802.16 Broadband Wireless Access Working Group, Jul. 5, 2007, pp. 1-5.

Relay Task Group of IEEE 802.16, "P802.16j Baseline Document, Part 16: Air Interface for Fixed and Mobile Broadband Wireless Access Systems, Multihop Relay Specification", Jun. 6, 2007, pp. i-xii, 1-191.

G-Q Wang et al., "Virtual BS and MMR-Cell Decomposition", IEEE 802.16 Session #44, San Diego, CA, Jul. 12, 2006, pp. 1-6.

Jerry Sydir et al., "Proposal on addresses, identifiers and types of connections for 802.16j", IEEE 802.16 Broadband Wireless Access Working Group, Nov. 16, 2006, pp. 1-9.

Jeffrey Z. Tao et al., "Enabling MAC tunneling over HARQ in 802.16j", IEEE 802.16j Mobile Multihop Relay Task Group, Apr. 6, 2007, pp. 1-6.

* cited by examiner

WIRELESS COMMUNICATION SYSTEM AND METHOD

PRIORITY

This application claims the benefit of U.S. Provisional Application No. 60/842,675, filed Sep. 7, 2006, which is incorporated by reference herein in its entirety for any purpose.

TECHNICAL FIELD

The present disclosure relates generally to methods and devices for wireless communication systems and, more particularly, to wireless communication systems, methods, and devices including control nodes, intermediary nodes, and destination nodes.

BACKGROUND

Due to an increasing number of wireless devices and a growing demand for wireless services, wireless communication systems continue to expand. To meet the growing demand, wireless providers have deployed a greater number of wireless transmitters. As an alternative, however, wireless providers have also utilized relay-based systems.

In a relay-based system, one node of a wireless system may communicate with another node in the wireless system using one or more intermediary nodes, called relay nodes. In some systems, the relay node may be referred to as a relay station, and the combination of nodes and connections between an originating node and a destination node may be referred to as a transmission path. Relay-based systems may be found in any type of wireless network.

An example of a relay-based system is a multi-hop relay (MR) network. FIG. 1 is a diagram of an exemplary prior art MR network 100 based on the Institute of Electrical and Electronics Engineers (IEEE) 802.16 family of standards.

As shown in FIG. 1, MR network 100 may include one or more transmitters, e.g., base station (BS) 110, one or more relay stations (RS) 120, including RSs 120a, 120b, and 120c, and one or more subscriber stations (SS) 130, including SSs 130w, 130x, 130y, and 130z.

In MR network 100, communication between a transmitter station (e.g., BS 110) and subscriber stations (e.g., SS 130w, SS 130x, SS 130y, SS 130z, etc.) may be achieved using one or more relay stations (e.g., RS 120a, RS 120b, RS 120c, etc.). For example, in MR network 100, RS 120a may receive data from BS 110 and send the data to another relay station (e.g., RS 120b). Alternatively, RS 120a may receive data from a subordinate relay station (e.g., RS 120b), and send it to BS 110. As another example, RS 120c may receive data from RS 120b and send the data to a supported subscriber station (e.g., SS 130w). Alternatively, RS 120c may receive data from a subscriber station (e.g., SS 130w), and send it to a dominant relay station (e.g., RS 120b).

Some embodiments, such as MR network 100, may use a scheduling algorithm by which subscriber stations (e.g., SS 130w, SS 130x, SS 130y, SS 130z, etc.) may compete only once for initial entry into the network (i.e., the communication network provided by serving BS 110 to subscriber stations within range). Once initial entry into the network is accomplished, access slots may be allocated by BS 110. In other embodiments, access slots may be dynamically allocated in each frame interval. In either case, the access slots may be enlarged or contracted, but the access slot remains assigned to a specific subscriber station, thereby precluding the use of the access slot by other subscriber stations.

FIG. 2 illustrates an exemplary Media Access Control (MAC) frame format based on the IEEE 802.16 family of standards using Orthogonal Frequency-Division Multiple Access (OFDMA). As shown in FIG. 2, transmission time may be divided into variable length sub-frames: an uplink (UL) sub-frame and a downlink (DL) sub-frame. Although not shown in detail, the UL sub-frame may include ranging channels, a channel quality information channel (CQICH), and UL data bursts containing data.

The DL sub-frame may include a preamble, a Frame Control Header (FCH), a DL-MAP, a UL-MAP, and a DL data burst area. The preamble may be used to provide a reference for synchronization. For example, the preamble may be used to adjust a timing offset, a frequency offset, and power. The FCH may contain frame control information for each connection including, for example, decode information for SSs 130.

DL-MAP and UL-MAP messages may be used to allocate channel access for downlink and uplink communication, respectively. That is, the DL-MAP message may provide a directory of access slot locations within the current downlink sub-frame, and the UL-MAP message may provide a directory of access slot locations within the current uplink sub-frame. In the DL-MAP message, this directory may take the form of one or more DL-MAP Information Elements (MAP IEs). Each MAP IE in the DL-MAP message may contain parameters for a single connection (i.e., the connection with a single SS 130). These parameters may be used to identify where, in the current sub-frame, a data burst may be located, the length of the data burst, the identity of the intended recipient of the data burst, and one or more transmission parameters.

For example, each MAP IE may contain a Connection ID (CID), identifying the destination device (e.g., SS 130w, SS 130x, SS 130y, SS 130z, etc.) for which a data burst is intended, a Downlink Interval Usage Code (DIUC), representing a downlink interval usage code by which downlink transmission is defined, an OFDMA Symbol Offset, indicating the offset of the OFDMA symbol in which a data burst starts, a sub-channel offset, indicating the lowest-index OFDMA sub-channel for carrying the burst, etc. Other parameters may also be included in the MAP IE including, for example, a boosting parameter, a parameter indicating a number of OFDMA symbols, a parameter indicating a number of sub-channels, etc. As used herein, prior art MAC headers and MAP IEs may be referred to as connection-switched control data.

DL-MAP and UL-MAP messages may each be followed by a data burst area. The data burst area may include one or more data bursts. Each data burst in the data burst area may be modulated and coded according to the control type of a corresponding connection-switched control data. For example, referring to FIG. 3, MAP IE "w" may provide control information for data burst "w," MAP IE "x" may provide control information for data burst "x," MAP IE "y" may provide control information for data burst "y," and MAP IE "z" may provide control information for data burst "z."

Referring again to FIG. 1, BS 110 may receive data bursts for SS 130w, SS 130x, SS 130y, and SS 130z, each of which are subscriber devices to RS 120c. BS 110 may generate connection-switched control data for each SS 130, inserting the connection-switched control data into a DL MAP IE slot of a frame. BS 110 may insert the associated data burst for each SS 130 into a data burst area corresponding to each connection-switched control data. BS 110 may transmit the frame to the first node along the transmission path, i.e., RS 120a. RS 120a may receive the data, and process each connection-switched control data to determine if any data is intended for a subscriber device of RS 120a. If none of the data is intended for a subscriber device of RS 120a, RS 120a may forward the data to the next RS 120 along the transmission path. In this example, none of the data is intended for a subscriber device of RS 120a, and RS 120a may transmit the data to RS 120b.

Similarly, RS 120b may receive the data, and process each control data to determine if any data is intended for a subscriber device of RS 120b. If none of the data is intended for a subscriber device of RS 120b, RS 120b may also forward the data to the next RS 120 along the transmission path, i.e., RS 120c. RS 120c may receive the data, and process each control data to determine if any data is intended for a subscriber device of RS 120c. In this example, SS 130w, SS 130x, SS 130y, and SS 130z are subscriber devices of RS 120c, and RS 120c may process the connection-switched control data, forwarding the appropriate data to each SS 130 according to the transmission parameters stored in the MAP IE.

In MR network 100, each RS 120 along the transmission path may process every connection-switched control data (e.g., MAC header and MAP IEs) in the frame until the individual control data, and their associated data, reach their destinations. Thus, for example, each of the connection-switched control data of FIG. 1 may be processed three times before they reach their destination. This may cause significant usage of system resources and corresponding transmission latency.

SUMMARY OF THE INVENTION

In one aspect, the present disclosure is directed to a method for processing wireless data in a wireless communication network, the wireless communication network including a plurality of intermediary nodes and a plurality of destination devices. The method includes determining at least one transmission path to each of the plurality of intermediary nodes. The at least one transmission path includes data associated with every intermediary node along the at least one transmission path. The method also includes determining a transmission path identifier for each of the at least one transmission paths, where the transmission path identifier is a destination node identifier, and sending transmission data to at least one destination device of the plurality of destination devices. The transmission data is sent based on at least one of the transmission path identifiers.

In another aspect, the present disclosure is directed to a wireless communication station for wireless communication in a wireless communication network, the wireless communication network including a plurality of intermediary nodes and a plurality of destination devices. The wireless communication station includes at least one memory to store data and instructions and at least one processor configured to access the memory. The at least one processor is configured to, when executing the instructions, determine at least one transmission path to each of the plurality of intermediary nodes. The at least one transmission path includes data associated with every intermediary node along the at least one transmission path. The at least one processor is also configured to, when executing the instructions, determine a transmission path identifier for each of the at least one transmission paths, where the transmission path identifier is a destination node identifier, and send transmission data to at least one destination device of the plurality of destination devices. The transmission data is sent based on at least one of the transmission path identifiers.

In another aspect, the present disclosure is directed to a method for performing data processing in an intermediary node. The method includes receiving, by a reception unit, transmission data. The transmission data includes at least one first control data and at least one second control data. Each of the at least one first control data includes a connection identifier, each of the at least one second control data includes a transmission path identifier, and the transmission path identifier is a destination node identifier. The method further includes processing, by the reception unit, the transmission data and buffering, by a buffer unit in communication with the reception unit, the processed data. In addition, the method includes receiving, by a transmission unit in communication with the buffer unit, the buffered data from the data buffer unit and performing pre-transmission processing on the buffered data. The method additionally includes configuring, by a control unit in communication with the reception unit, the buffer unit, and the transmission unit, one or more reception parameters associated with the reception unit.

In another aspect, the present disclosure is directed to an intermediary node for performing data processing in a wireless communication network. The intermediary node includes a reception unit operable to receive and process transmission data. The transmission data includes at least one first control data and at least one second control data. Each of the at least one first control data includes a connection identifier, each of the at least one second control data includes a transmission path identifier, and the transmission path identifier is a destination node identifier. The intermediary node further includes a buffer unit in communication with the reception unit and configured to buffer the processed data and a transmission unit in communication with the buffer unit and configured to receive the buffered data from the data buffer unit. In addition, the intermediary node includes a control unit in communication with the reception unit, the buffer unit, and the transmission unit, and operable to configure one or more reception parameters associated with the reception unit.

In another aspect, the present disclosure is directed to a method for processing data in a wireless communication network, the wireless communication network including a plurality of intermediary nodes and a plurality of destination devices. The method includes receiving data for transmission to at least one destination device of the plurality of destination devices and determining a transmission path to a destination intermediary node. The at least one destination device communicates with the destination intermediary node. The method further includes assigning a first control data to the data, the first control data including one or more parameters associated with the at least one destination device. The method also includes assigning a second control data to the data, the second control data including a transmission path identifier, where the transmission path identifier is a destination node identifier. In addition, the method includes transmitting at least one transmission frame along the transmission path, the at least one transmission frame including the data.

In another aspect, the present disclosure is directed to a wireless communication station for wireless communication in a wireless communication network, the wireless communication network including a plurality of intermediary nodes and a plurality of destination devices. The wireless communication station includes at least one memory to store data and instructions and at least one processor configured to access the memory. The at least one processor is configured to, when executing the instructions, receive data for transmission to at least one destination device of the plurality of destination devices and determine a transmission path to a destination intermediary node. The at least one destination device communications with the destination intermediary node. The at least one processor is further configured to assign a first control data to the data, the first control data including one or more parameters associated with the at least one destination device. The at least one processor is also configured to assign a second control data to the data, the second control data including a transmission path identifier, where the transmission path identifier is a destination node identifier. In addition, the at least one processor is configured to transmit the at least one transmission frame along the transmission path, the at least one transmission frame including the data.

In another aspect, the present disclosure is directed to a method for processing data by an intermediary node in a wireless communication network, the wireless communication network including a plurality of intermediary nodes and a plurality of destination devices. The method includes receiving data, the data including destination device data for at least one destination device of the plurality of destination devices, at least one first control data, and at least one second control data. Each of the at least one first control data includes a connection identifier, each of the at least one second control data includes a transmission path identifier, and the transmission path identifier is a destination node identifier. The method further includes evaluating the transmission path identifier in each of the at least one second control data and processing the data based on the transmission path identifier.

In another aspect, the present disclosure is directed to an intermediary node in a wireless communication network, the wireless communication network including a plurality of intermediary nodes and a plurality of destination devices. The intermediary node includes at least one memory to store data and instructions and at least one processor configured to access the memory. The at least one processor is configured to, when executing the instructions, receive data, the data including destination device data for at least one destination device of the plurality of destination devices, at least one first control data, and at least one second control data. Each of the at least one first control data includes a connection identifier, each of the at least one second control data includes a transmission path identifier, and the transmission path identifier is a destination node identifier. The at least one processor is further configured to evaluate the transmission path identifier in each of the at least one second control data and process the data based on the transmission path identifier.

DETAILED DESCRIPTION

Figure 1:
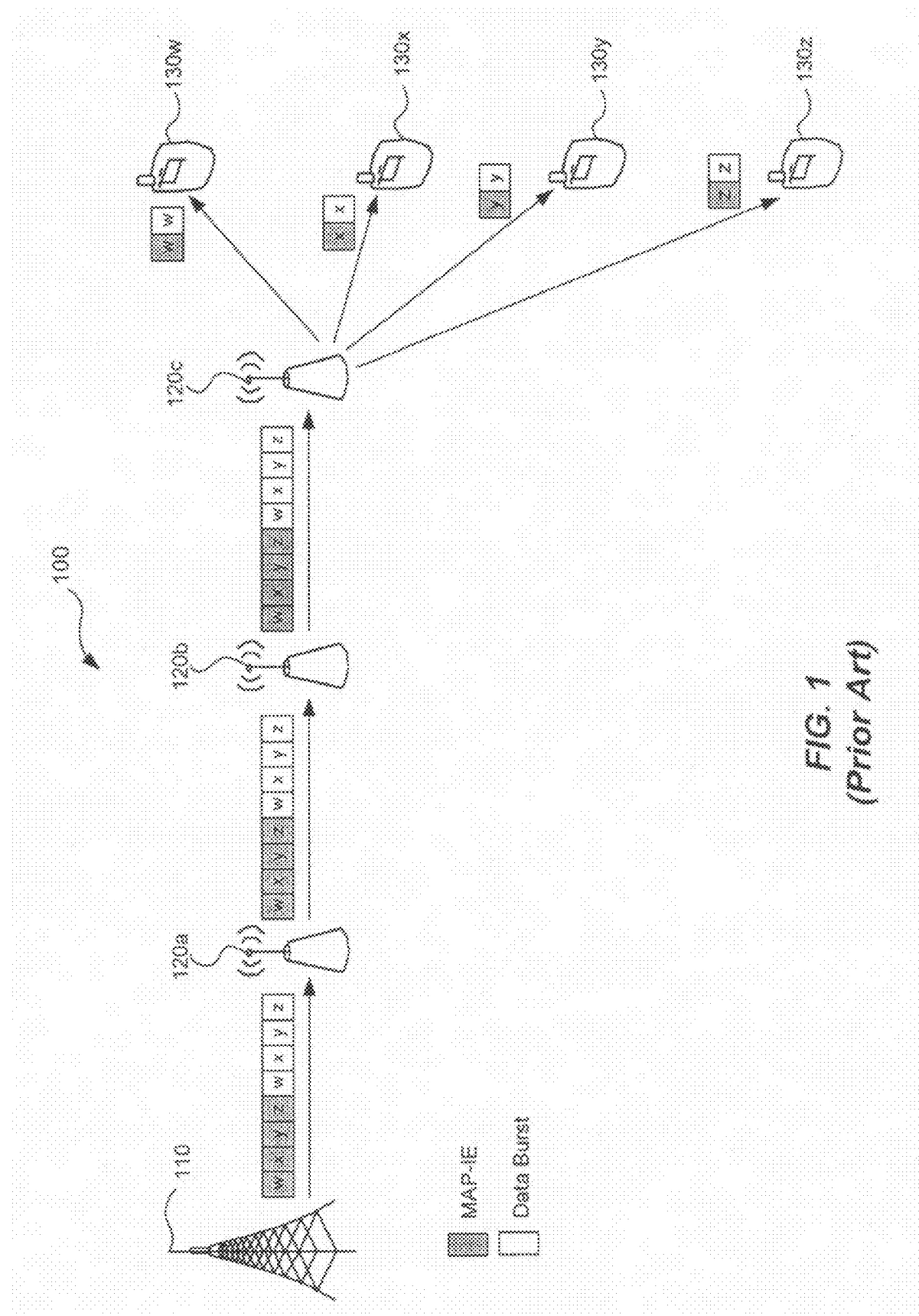
FIG. 1 is a block diagram of an exemplary prior art Multi-Hop Relay (MR) network.
Figure 2:
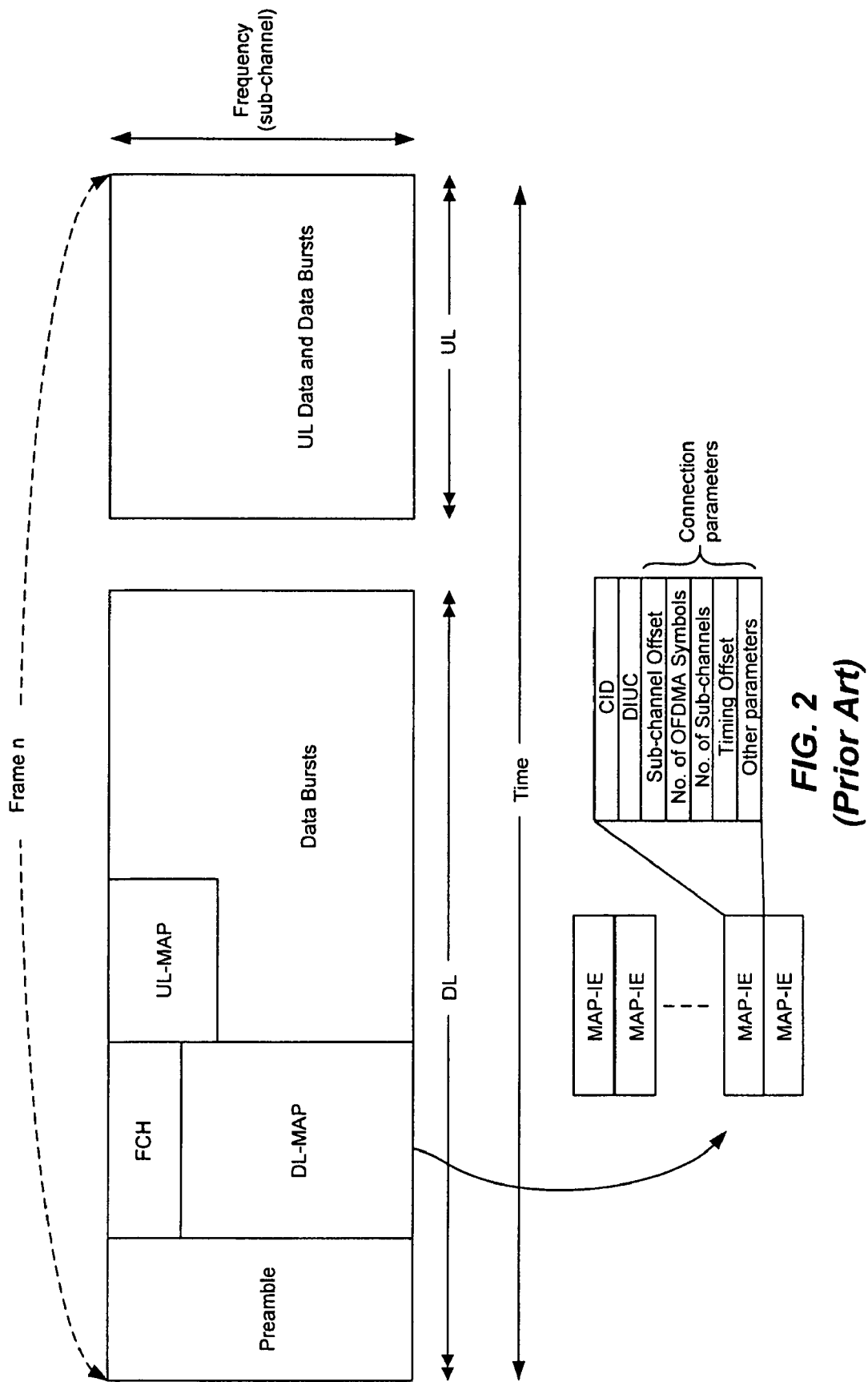
FIG. 2 illustrates an exemplary prior art MAC Frame Control format.
Figure 3:
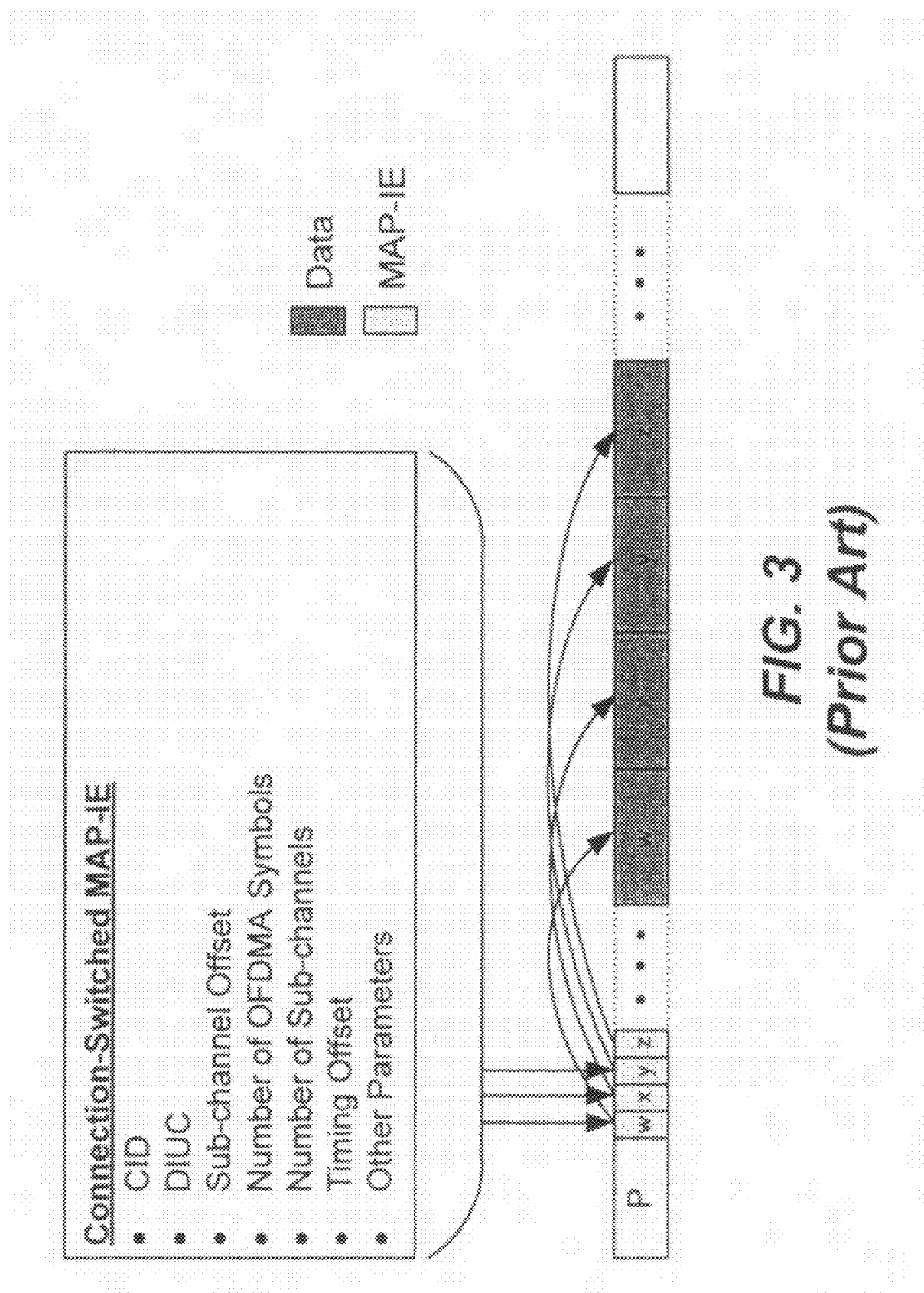
FIG. 3 illustrates an exemplary prior art MAP IE.
Figure 4:
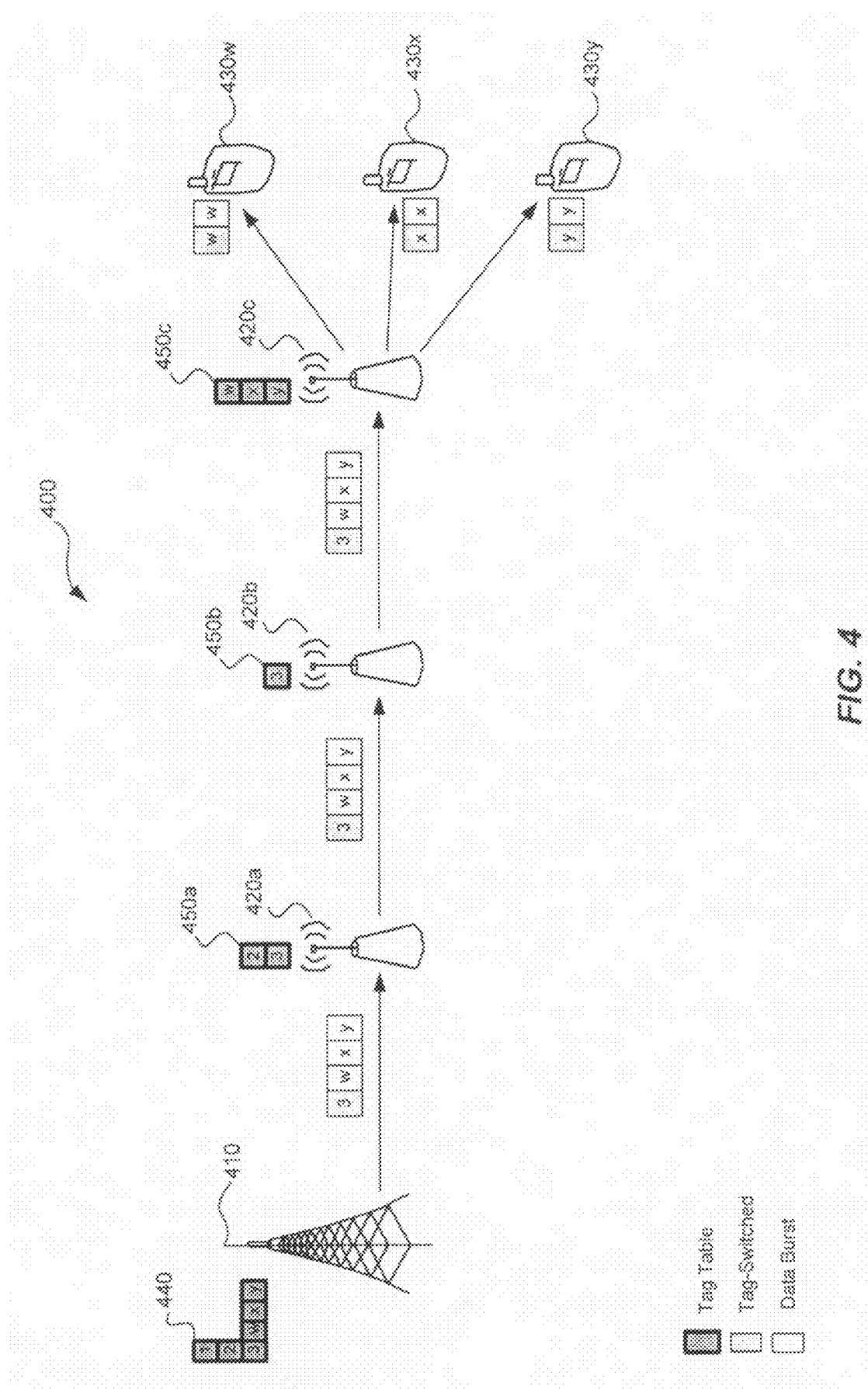
FIG. 4 is a block diagram of exemplary message processing in a tag-switched network, consistent with certain disclosed embodiments.

FIG. 4 is a block diagram of an exemplary tag-switched network 400, consistent with certain disclosed embodiments. A tag-switched network 400 may be one in which one or more tags are used for routing data and/or communications. In one exemplary embodiment, tag-switched network 400 may be based on the IEEE 802.16 family of standards. As shown in FIG. 4, tag-switched network 400 may include one or more transmitters, e.g., base station (BS) 410, one or more relay stations (RS) 420, including RSs 420a, 420b, and 420c, and one or more subscriber stations (SS) 430, including SSs 430w, 430x, and 430y.

BS 410 may be any type of communication device configured to transmit and/or receive data and/or communications based on one or more wireless standards, many of which are known in the art. For example, BS 410 may be configured to communicate with one or more SSs 430, RSs 420, one or more other BSs 410, and/or other networks (not shown) using the communication protocols defined by the IEEE 802.16 family of standards. In some embodiments, BS 410 may also be referred to as, for example, a Node-B, a base transceiver system (BTS), an access point, etc.

Figure 5A:
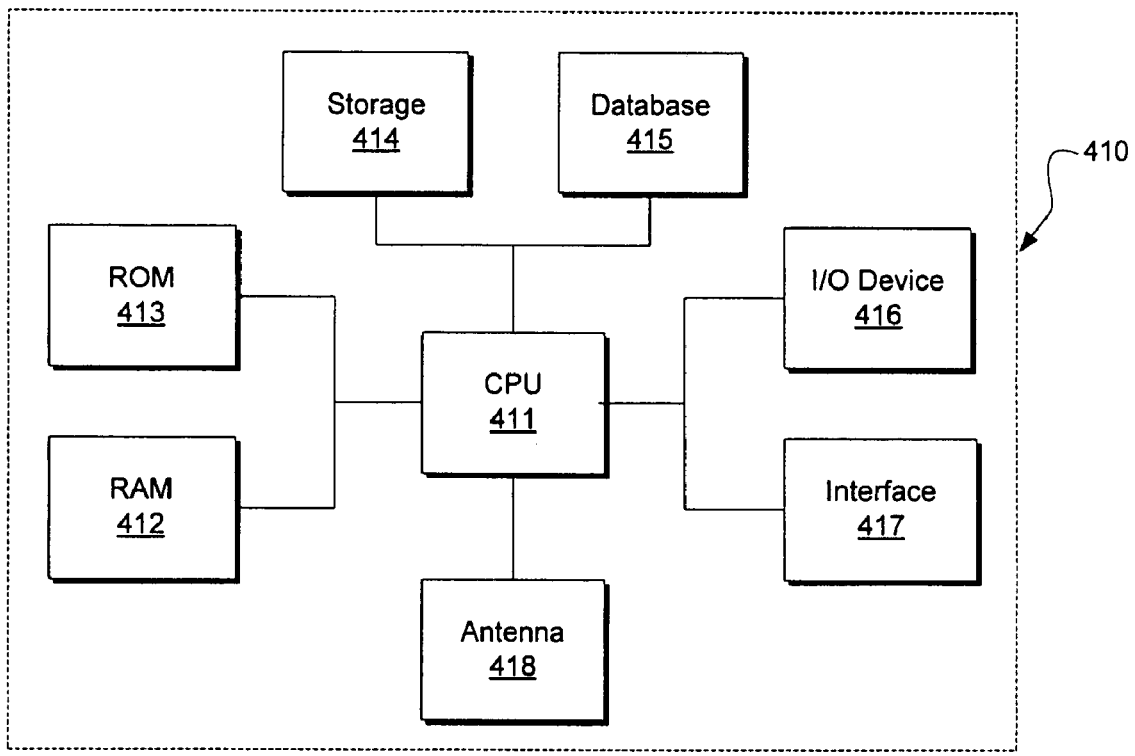
FIG. 5a is a block diagram of an exemplary Base Station (BS), consistent with certain disclosed embodiments.

As shown in FIG. 5a, BS 410 may include one or more of the following components: at least one central processing unit (CPU) 411 configured to execute computer program instructions to perform various processes and methods, random access memory (RAM) 412 and read only memory (ROM) 413 configured to access and store information and computer program instructions, memory 414 to store data and information, one or more databases 415 to store tables, lists, or other data structures, one or more I/O devices 416, one or more interfaces 417, one or more antennas 418, etc. Each of these components is well-known in the art and will not be discussed further.

Referring again to FIG. 4, in one exemplary embodiment, BS 410 may be configured to create and store one or more BS tag tables 440. BS tag tables 440 may include data associated with one or more nodes and/or one or more transmission paths in tag-switched network 400. For example, BS tag table 440 may include one or more relay node identifiers, one or more transmission paths, and/or one or more transmission path identifiers, as well as relationships between the data. In addition, BS tag table 440 may include other parameters, such as, for example, transmission parameters related to one or more transmission paths, transmission parameters related to one or more RSs 420, transmission parameters related to one or more SSs 430, etc.

The one or more relay node identifiers may be used to uniquely identify each node in tag-switched network 400. The one or more nodes may include, for example, BS 410, one or more RSs 420, and/or one or more SSs 430. The one or more transmission paths may each include one or more RSs 420 by which data may be routed through tag-switched network 400, and each transmission path may be uniquely identified by a transmission path identifier, which may be called a "tag" or "tag-switched connection identifier." In one exemplary embodiment, the one or more transmission paths may also be known as the "relay paths." In some embodiments, the disclosed transmission method may be referred to as tunnel transmission, and the tag-switched connection identifier may be referred to as a tunnel CID.

In one exemplary embodiment, the tag may serve as an index into BS tag table 440. For example, the transmission path from BS 410 to RS 420a may include RS 420a, and may be identified by the tag "1." The transmission path from BS 410 to RS 420b may include RS 420a and RS 420b, and may be identified by the tag "2." Tag "3" may identify the transmission path from BS 410 to RS 420c which may include RS 420a, RS 420b, and RS 420c. In some embodiments, BS tag table 440 may be configured to uniquely identify more than one transmission path to one or more RSs 420 in tag-switched network 400.

Alternatively and/or additionally, BS tag table 440 may identify relationships between one or more nodes in tag-switched network 400. For example, BS tag table 440 may identify subordinate and dominant relationships between one or more nodes in tag-switched network 400. In addition, BS tag table 440 may identify a serving RS 420 or BS 410 for each SS 430 in tag-switched network 400. The serving RS 420 or BS 410 may be the node through which SS 430 transmits and/or receives data with tag-switched network 400. As shown in FIG. 4, RS 420c is the serving RS 420 for SS 430w, SS 430x, and SS 430y. Thus, BS tag table 440 may contain data associated with SS 430w (i.e., CID=w), SS 430x (i.e., CID=x), and SS 430y (i.e., CID=y).

BS 410 may also be configured to create one or more RS tag tables 450. RS tag tables 450 may include information associated with BS 410, one or more RSs 420, and/or one or more SS 430. For example, RS tag tables 450 may include one or more relay node identifiers, one or more transmission paths, and/or one or more transmission path identifiers. In addition, RS tag tables 450 may include other parameters, such as, for example, transmission parameters related to one or more transmission paths, transmission parameters related to one or more RSs 420, transmission parameters related to one or more SSs 430, etc.

In one exemplary embodiment, one or more RS tag tables 450 may be uniquely generated for each RS 420, and may include information associated with one or more transmission paths of which the particular RS 420 may be a node. Thus, for example, RS tag table 450 of one of RS 420 may include data associated with all SSs 430 directly connected to that RS 420 as well as all subordinate RSs 420. For example, referring to FIG. 4, RS tag table 450a may include data associated with the transmission path from BS 410 to RS 420b, identified by tag "2," and the transmission path from BS 410 to RS 420c, identified by tag "3," both of which may include RS 420a. Similarly, RS tag table 450b may include data associated with the transmission path from BS 410 to RS 420c, identified by tag "3," which includes RS 420b. In some embodiments, RS tag tables 450 may include data associated with one or more SSs 430. For example, RS tag table 450c may include data associated with SS 430w (i.e., "w"), SS 430x (i.e., "x"), and SS 430y (i.e., "y"). In one exemplary embodiment, tags stored in the tag-switched control data may serve as indexes into the RS tag tables 450, and may allow each RS 420 to perform routing and transmission of data according to the parameters found in RS tag tables 450 and the tag-switched MAP IEs.

BS 410 maybe configured to create and/or store one or more BS tag tables 440 and/or one or more RS tag tables 450 when there is any type of change to tag-switched network 400. For example, BS 410 may create one or more BS tag tables 440 and/or RS tag tables 450 when tag-switched network 400 is first established, when one or more RSs 420 are deployed in tag-switched network 400, when one or more RSs 420 are redeployed in tag-switched network 400, and the like.

RS 420 may be any type of communication device configured to transmit and/or receive data and/or communications with one or more SSs 430, RSs 420, and/or other BS 410 using the communication protocols defined by one or more wireless standards. In certain disclosed embodiments, RS 420 may serve as an intermediary between one or more SSs 430, RSs 420, and/or BSs 410. For example, RS 420 may receive data from BS 410, and send the data to one or more subordinating SSs 430 and/or RSs 420. Similarly, in the reverse direction, RS 420 may receive data from SS 430 or a subordinate RS 420, and transmit the data to another RS 420 or BS 410.

In addition, RS 420 may be configured to store and/or access one or more RS tag tables 450. For example, as shown in FIG. 4, RS 420a may store RS tag table 450a, RS 420b may store RS tag table 450b, and RS 420c may store RS tag table 450c.

Figure 5B:
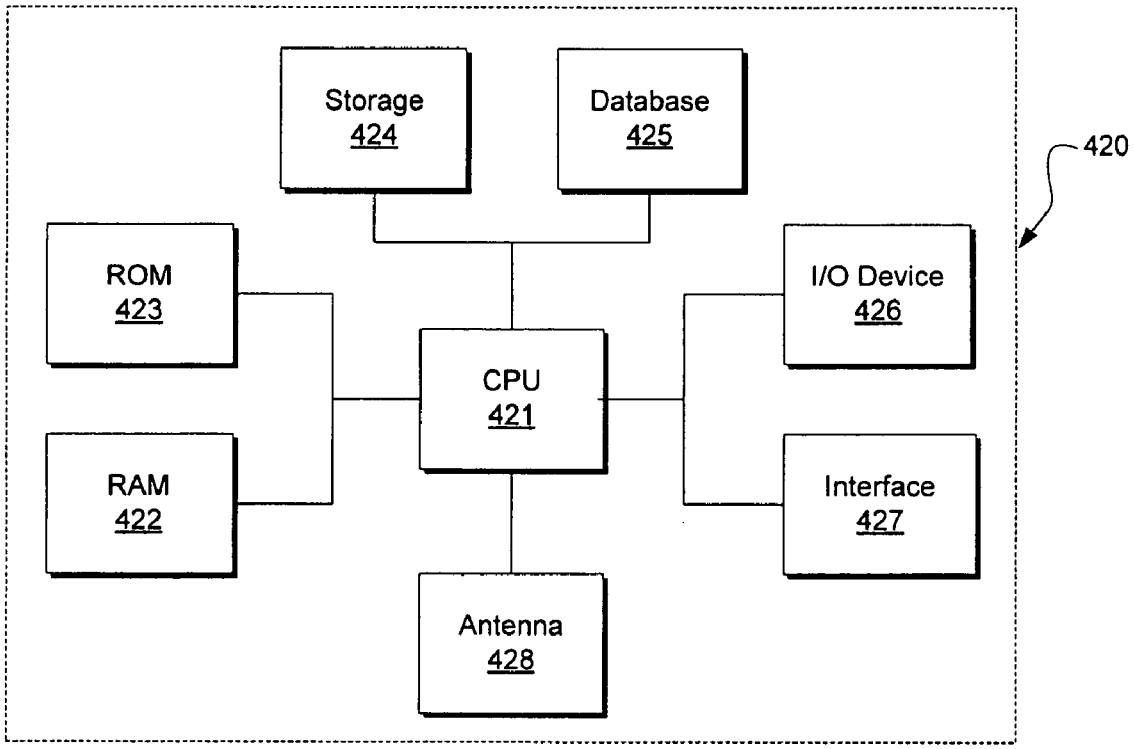
FIG. 5b is a block diagram of an exemplary Relay Station (RS), consistent with certain disclosed embodiments.

As shown in FIG. 5b, RS 420 may include one or more of the following components: at least one central processing unit (CPU) 421 configured to execute computer program instructions to perform various processes and methods, random access memory (RAM) 422 and read only memory (ROM) 423 configured to access and store information and computer program instructions, memory 424 to store data and information, one or more databases 425 to store tables, lists, or other data structures, one or more I/O devices 426, one or more interfaces 427, one or more antennas 428, etc. Each of these components is well-known in the art and will not be discussed further.

SS 430 may include any type of wireless client device configured to communicate with BS 410 and/or other SSs 430 and RSs 420 using one or more wireless communication standards. SSs 430 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 430 may be a mobile computing device. In other embodiments, SS 430 may be a "non-mobile" computing device located in a mobile environment (e.g., airplanes, watercraft, buses, multi-passenger vehicles, automobiles, etc.).

Figure 5C:
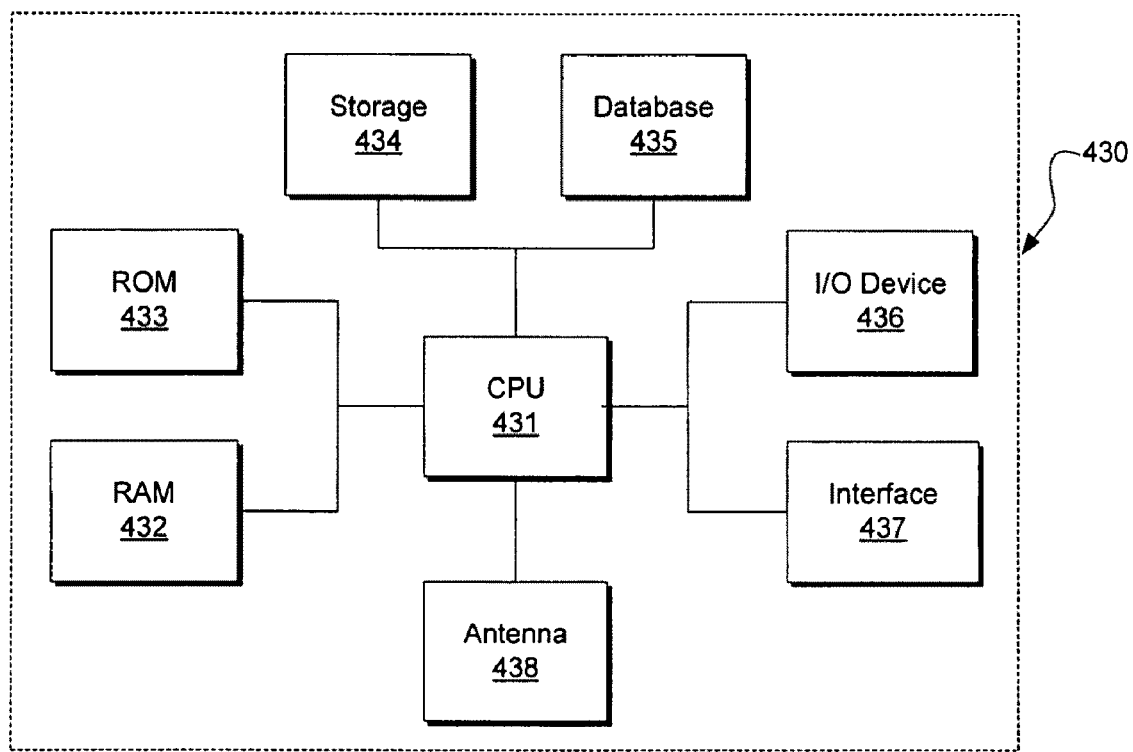
FIG. 5c is a block diagram of an exemplary Subscriber Station (SS), consistent with certain disclosed embodiments.

As shown in FIG. 5c, SS 430 may include one or more of the following components: at least one central processing unit (CPU) 431 configured to execute computer program instructions to perform various processes and methods, random access memory (RAM) 432 and read only memory (ROM) 433 configured to access and store information and computer program instructions, memory 434 to store data and information, one or more databases 435 to store tables, lists, or other data structures, one or more I/O devices 436, one or more interfaces 437, one or more antennas 438, etc. Each of these components is well-known in the art and will not be discussed further.

In one exemplary embodiment, one or more DL-MAP and UL-MAP messages may be used to allocate channel access for downlink and uplink communication, respectively. That is, the DL-MAP messages may each include one or more DL-MAP Information Elements (MAP IEs), and each of the one or more DL-MAP IEs may include parameters associated with an access slot within the current downlink sub-frame. The UL-MAP messages may each include one or more UL-MAP IEs, and each of the one or more UL-MAP IEs may include parameters associated with an access slot within the current uplink sub-frame. Additionally and/or alternatively, one or more Hybrid Automatic Repeat reQuest (HARQ) MAP messages may be used to allocate channel access for downlink and uplink communication. For example, the HARQ MAP messages may each include one or more DL-or UL-HARQ MAP IEs, and each of the one or more DL-or UL-HARQ MAP IEs may include parameters associated with an access slot within the current uplink or downlink sub-frame, i.e., HARQ data bursts. In one exemplary embodiment, the DL-or UL-HARQ MAP IE may include a Reduced CID (RCID), identifying the destination device (e.g., SS 430$w$, SS 430$x$, SS 430$y$, etc.) for which a data burst is intended. As used herein, MAP messages may include, for example, UL-MAP messages, DL-MAP message, DL-and/or UL-HARQ MAP messages, etc.; MAP IEs may include, for example, UL-MAP IEs, DL-MAP IEs, DL-and/or UL-HARQ MAP IEs, etc.; and CIDs may include, for example, CIDs, RCIDs, etc.

Figure 6A:
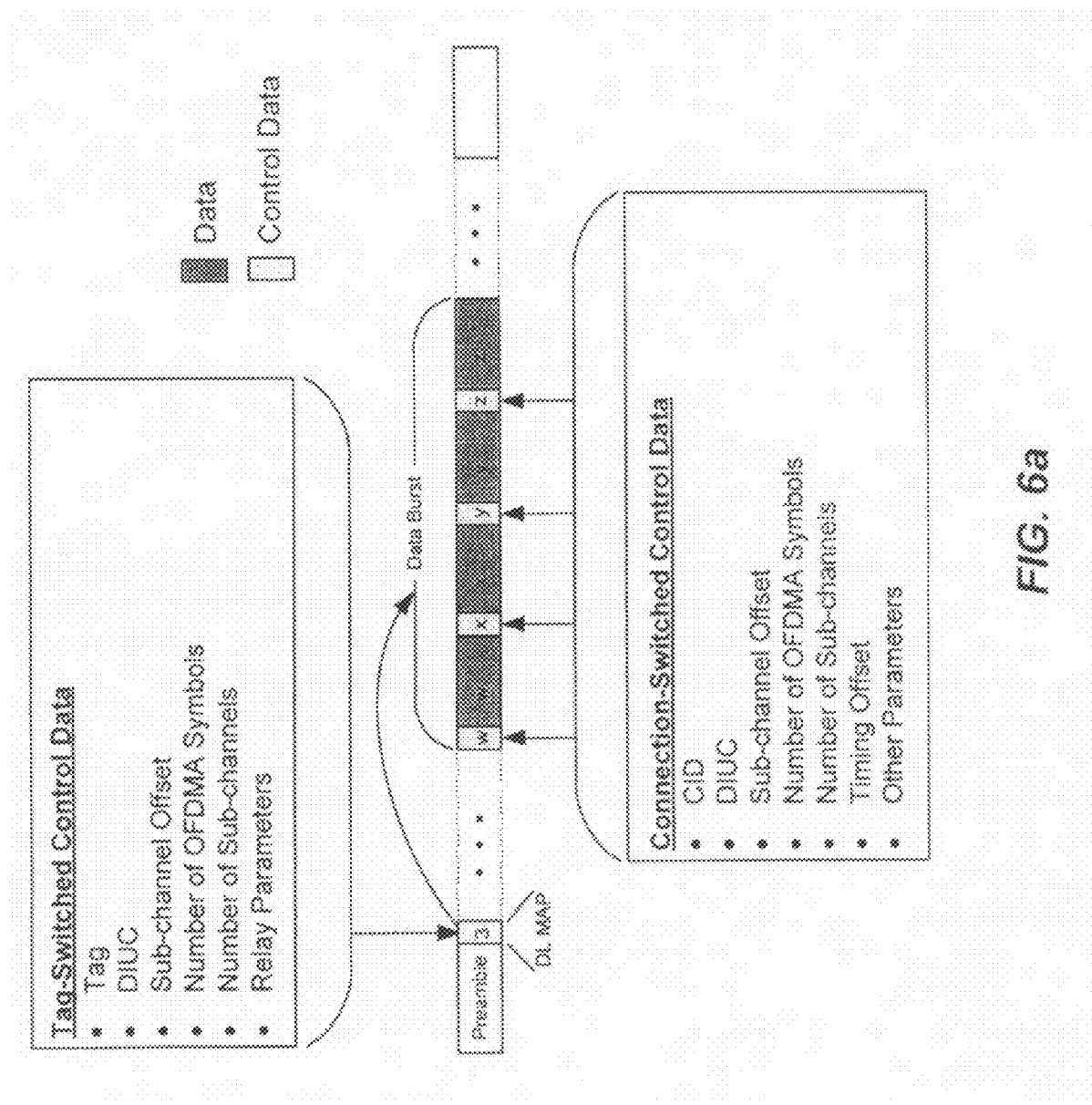
FIG. 6a illustrates an exemplary tag-switched data processing, consistent with certain disclosed embodiments.
Figure 6B:
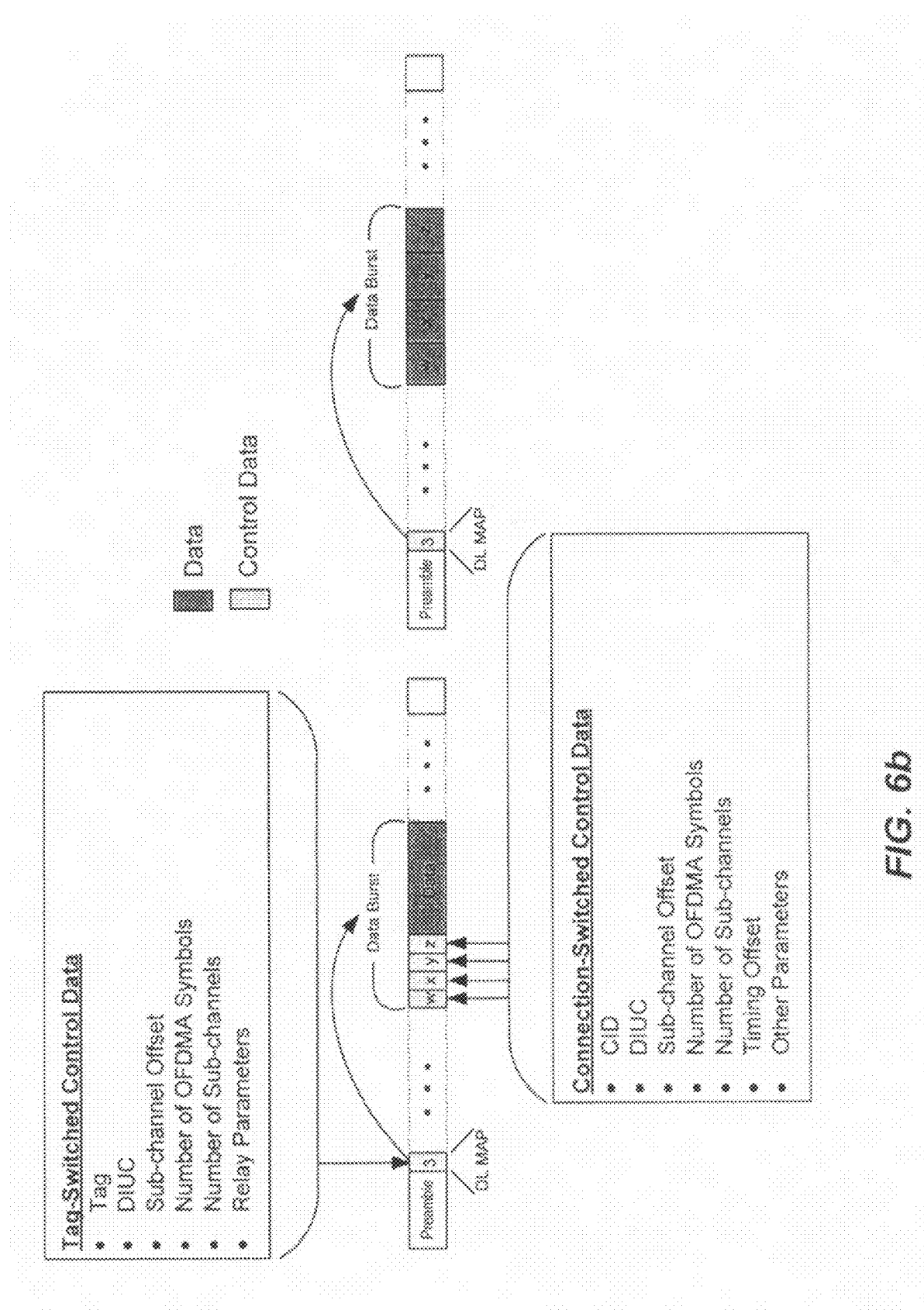
FIG. 6b illustrates an exemplary tag-switched data processing, consistent with certain disclosed embodiments.

FIG. 6$a$ illustrates an exemplary transmission of tag-switched control data in connection with transmission of connection-switched control data fields in a tag-switched network, such as, for example, tag-switched network 400, consistent with certain disclosed embodiments. As shown in FIG. 6$a$, one or more connection-switched control data (i.e., MAP IEs containing CIDs and/or RCIDs) may be replaced with a single tag-switched control data (i.e., MAP IE containing a tag), and the one or more connection-switched control data may be moved into data burst portion of a sub-frame associated with the tag-switched control data. The tag-switched control data may be used to transmit a frame along a transmission path from BS 410 to a destination RS 420. The connection-switched control data may be used by the destination RS 420 to process and send the data to one or more SSs 430. The destination RS 420 may be the serving RS 420 for the one or more SSs 430.

For example, tag-switched control data "3" may be stored in place of the CID (or RCID) in the MAP message area, and the connection switched control data, "w," "x," and "y" may be located in the data portion with their associated data bursts. Control data "3" may provide details as to the location (e.g., position and length) of the control data and data for "w," "x," and "y" in the data burst portion of the frame. Because the tag-switched control data identifies the transmission path, the tag-switched control data may use only those transmission parameters related to the relay links. For example, the tag-switched control data may contain a tag value to identify a transmission path to serving RS 420, DIUC for the relay link, parameters identifying the location of the data in the current frame, etc.

Thus, the single tag may be used to identify and administer all connections along a single transmission path. In one exemplary embodiment, each RS 420 along the transmission path would maintain an RS tag table 450 identifying the connections along the transmission path, and may be capable of forwarding the data to the next node until the destination node is reached. In another exemplary embodiment, routing information may be embedded in the transmission path ID, and one or more associated instructions may be stored in memory during pre-configuration or signaling. In this manner, RS 420 may be configured to access the instructions, decode the transmission path ID, and forward the data without accessing RS tag table 450. Once the packet data arrives at the destination node, the destination node may be configured to unpack and process the frame data and send the data burst to the destination device, i.e., SS 430.

For example, referring again to FIG. 4, BS 410 may transmit data bursts (i.e., data bursts w, x, and y) to one or more SSs 430 by means of a single frame. Instead of using a plurality of control data, each containing a CID or RCID, BS 410 may use a single tag-switched control data containing a tag which identifies the transmission path. For example, BS 410 may transmit data to SS 430$w$, SS 430$x$, and SS 430$y$, each of which are subordinate to RS 420$c$, by identifying the common transmission path to RS 420$c$. Thus, BS 410 may use the single tag-switched control data for processing through intermediate RS 420$a$ and RS 420$b$, replacing three connection-switched control data with the single tag-switched control data identifying the transmission path to RS 420$c$, which provides service to SS 430$w$, SS 430$x$, and SS 430$y$.

FIG. 6$b$ illustrates exemplary transmission of tag-switched control data prior to transmission of connection-switched control data fields in a tag-switched network, such as, for example, tag-switched network 400, consistent with certain disclosed embodiments. As shown in FIG. 6$b$, tag-switched control data (i.e., MAP IE containing a tag) in frames may be used in conjunction with one or more connection-switched control data (i.e., MAP IEs containing CIDs and/or RCIDs) in other frames to transmit data. For example, a tag-switched control data in a first frame may provide transmission path routing information for one or more connection-switched control data contained in the data burst portion of sub-frames in one or more subsequent frames. The tag-switched control data may be used to transmit a frame along a transmission path from BS 410 to a destination RS 420. The connection-switched control data may be used by the destination RS 420 to process and send the data to one or more SSs 430. The destination RS 420 may be the serving RS 420 for the one or more SSs 430. In one exemplary embodiment, the subsequent frame is immediately subsequent. Alternatively and/or additionally, the subsequent frame may be any frame which follows a first frame containing the tag-switched control data associated with the subsequent frame.

For example, tag-switched control data "3" may be stored in place of the CID (or RCID) in the MAP message area of a first frame, and the connection switched control data, "w," "x," and "y" may be located in the data portion of the same frame. The data associated with the tag-switched control data "3" may provide details as to where the control data for "w," "x," and "y" may be found in the data burst portion of the same frame. In addition, tag-switched control data "3" may provide details as to where the data for "w," "x," "y" may be found in the data burst portion of a subsequent frame. Because the tag-switched control data identifies the transmission path, the tag-switched control data may use only those transmission parameters related to the relay links. For example, the tag-switched control data may contain a tag value to identify a transmission path to serving RS 420, DIUC for the relay link, parameters identifying the location of the data in the current frame, parameters identifying the location of the data in subsequent frames, etc.

Figure 6C:
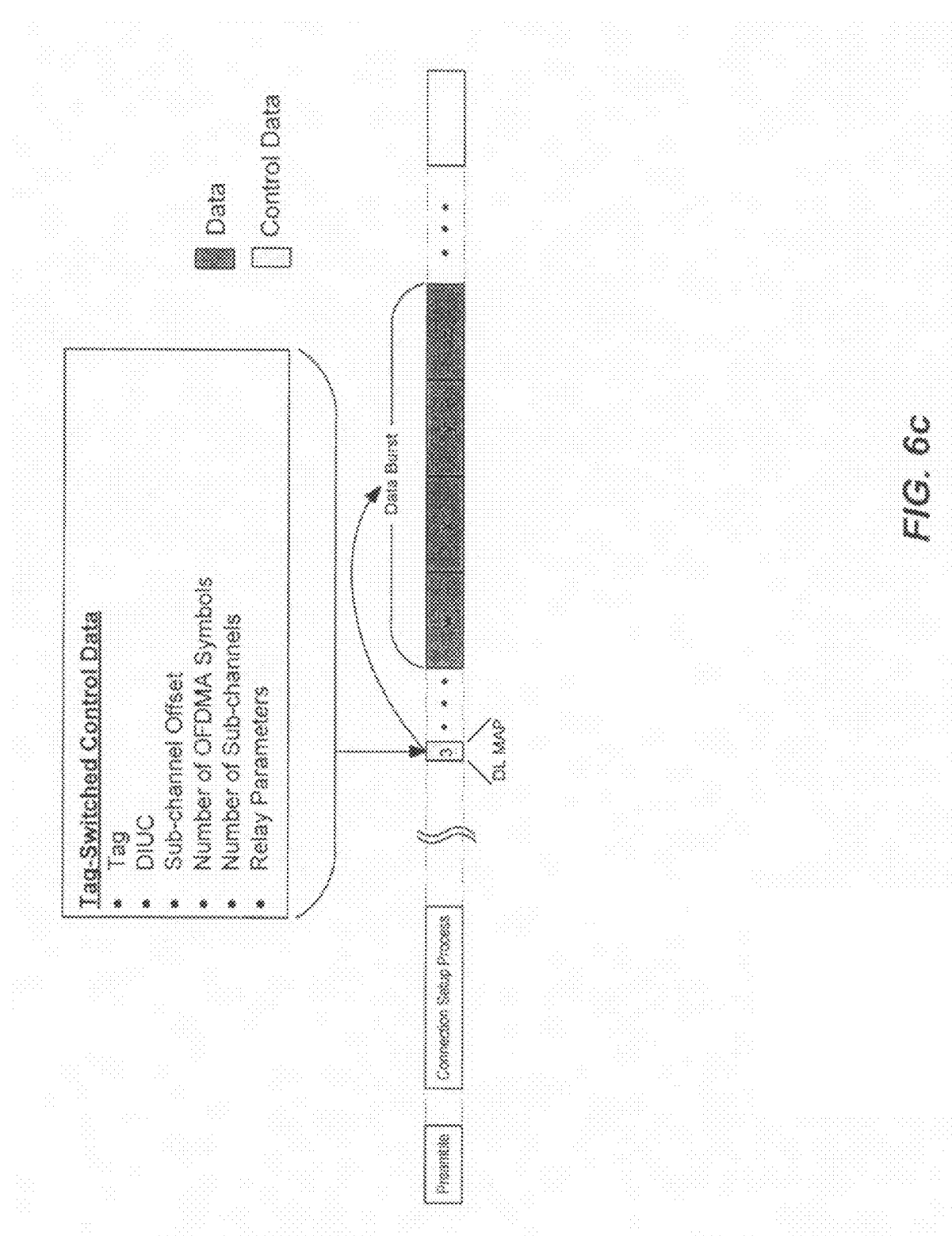
FIG. 6c illustrates an exemplary tag-switched data processing, consistent with certain disclosed embodiments.

FIG. 6$c$ illustrates exemplary transmission of tag-switched control data subsequent to configuration of connection-switched control data fields in a tag-switched network, such as, for example, tag-switched network 400, consistent with certain disclosed embodiments. As shown in FIG. 6c, connection-switched control data may be configured during connection setup. Configuration may include, for example, transmission of one or more connection-switched control data identifying one or more data burst fields in subsequent frames. Thus, when one or more frames are sent subsequently to the connection setup, the tag-switched control data (i.e., MAP IE containing a tag) may be used in conjunction with one or more connection-switched control data (i.e., MAP IEs containing CIDs and/or RCIDs) configured during connection setup to transmit data. In one exemplary embodiment, the subsequent frame may be any frame which follows the connection setup process.

For example, tag-switched control data "3" may be stored in place of the CID (or RCID) in the MAP message area of a first frame, and data portions, "w," "x," and "y" may be located in the data portion of the same frame. The data associated with the tag-switched control data "3" may provide details as to where the data portions for "w," "x," and "y" may be found in the data burst portion of the same frame. The connection-switched control data configured during connection setup may be used to route the data for "w," "x," and "y" and may be found in the data burst portion of that frame.

Figure 7A:
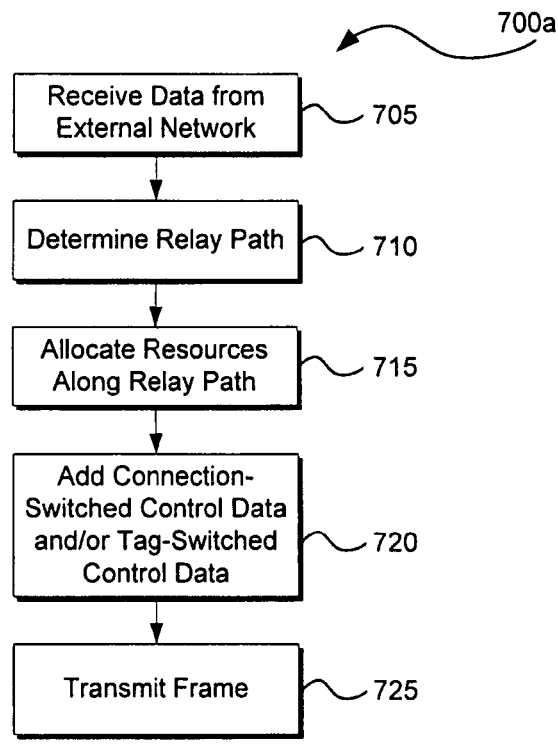
FIG. 7a is a flow chart illustrating an exemplary BS Downlink processing, consistent with certain disclosed embodiments.

FIG. 7a is an exemplary flow chart 700a illustrating processing of a downlink communication sent from BS 410. BS 410 may receive data from an external network (step 705), and determine the destination SS 430 for the data. Based on the destination SS 430, BS 410 may determine a transmission path (step 710), including a tag identifier. BS 410 may allocate the resources along the transmission path (step 715). In addition, BS 410 may add one or more connection-switched control data and one or more tag-switched control data, assigning transmission parameters for both (step 720). BS 410 may then transmit the frame (step 725).

Figure 7B:
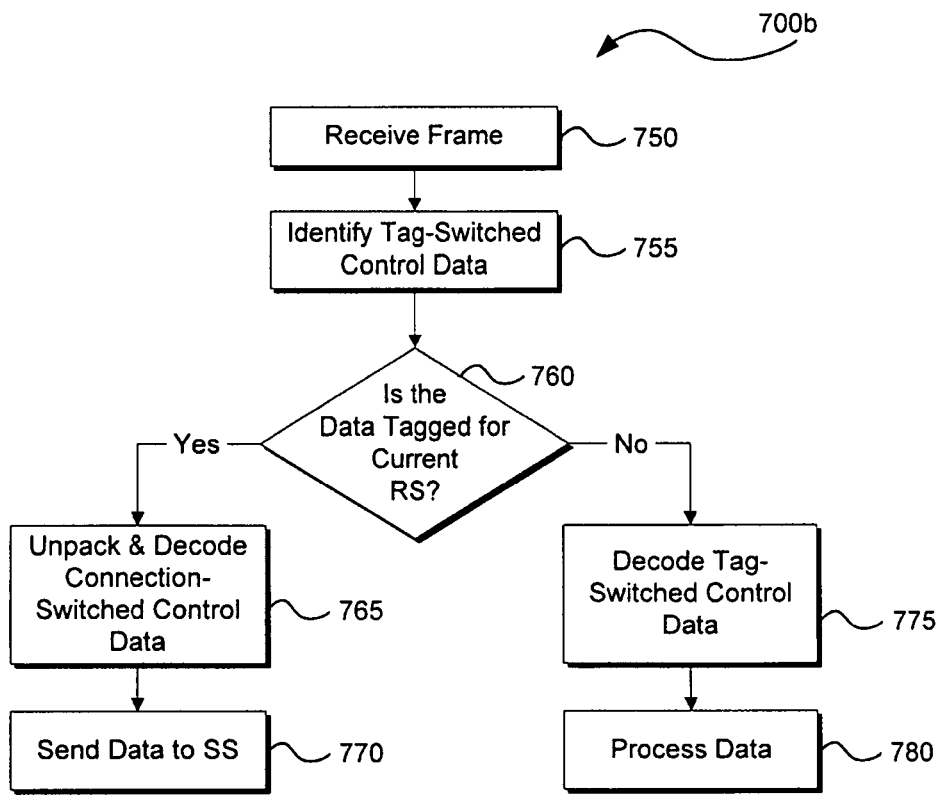
FIG. 7b is a flow chart illustrating an exemplary RS Downlink processing, consistent with certain disclosed embodiments.

FIG. 7b is an exemplary flow chart 700b illustrating processing of a downlink communication received by RS 420 from BS 410. RS 420 may receive frame data from BS 410 (step 750), identifying one or more tag-switched control data in the frame (step 755). RS 420 may check the tag-switched control data to determine if the frame is tagged for itself (step 760). If RS 420 determines that the frame is tagged for itself (step 760, Yes), RS 420 may unpack the data and decode the connection-switched control data contained in the data burst area of the frame (step 765). In addition, RS 420 may send data associated with one or more connection-switched control data to the SSs 430 identified by their respective connection-switched control data (step 770).

If RS 420 determines that the frame is intended for another RS 420 (step 760, No), RS 420 may forward the data to the next RS 420 along the transmission path. In one exemplary embodiment, RS 420 may access RS tag table 450 and, using the tag as an index into the table, decode the tag-switched control data to determine the transmission path associated with the tag (step 775). In another exemplary embodiment, routing information may be embedded in the transmission path ID, and one or more associated instructions may be stored in memory during pre-configuration or signaling. In this manner, RS 420 may be configured to access the instructions, decode the transmission path ID, and forward the data without accessing RS tag table 450.

Based on the results of decoding, RS 420 may process the data (step 780). In one exemplary embodiment, RS 420 may process the data by, for example, forwarding the frame to the next RS 420 in the transmission path. Alternatively, RS 420 may drop the frame. That is, RS 420a may forward data to nodes which are in the transmission path for RS 420a, and drop data that is destined for nodes not in the transmission path of RS 420. In this manner, BS 410 may send frame data to a destination SS 430 by means of one or more RSs 420 using a tag-switched control data.

Figure 8A:
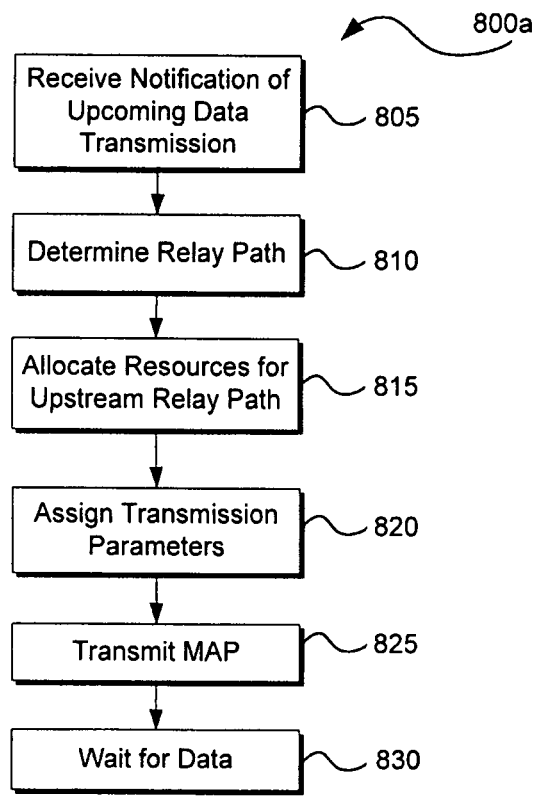
FIG. 8a is a flow chart illustrating an exemplary BS Uplink processing, consistent with certain disclosed embodiments.

FIG. 8a is an exemplary flow chart 800a illustrating processing of an uplink communication received from RS 420 by BS 410. BS 410 may receive notification of an upcoming data transmission (step 805). BS 410 may identify a transmission path for the data transmission (step 810), and may allocate resources along the upstream transmission path (step 815). In addition, BS 410 may assign tag-switched control data transmission parameters for SS 430 and RSs 420 along the transmission path (step 820). BS 410 may transmit a control message (i.e., MAP message) containing the transmission parameters to SS 430 (step 825), and wait for data from SS 430 (step 830).

Figure 8B:
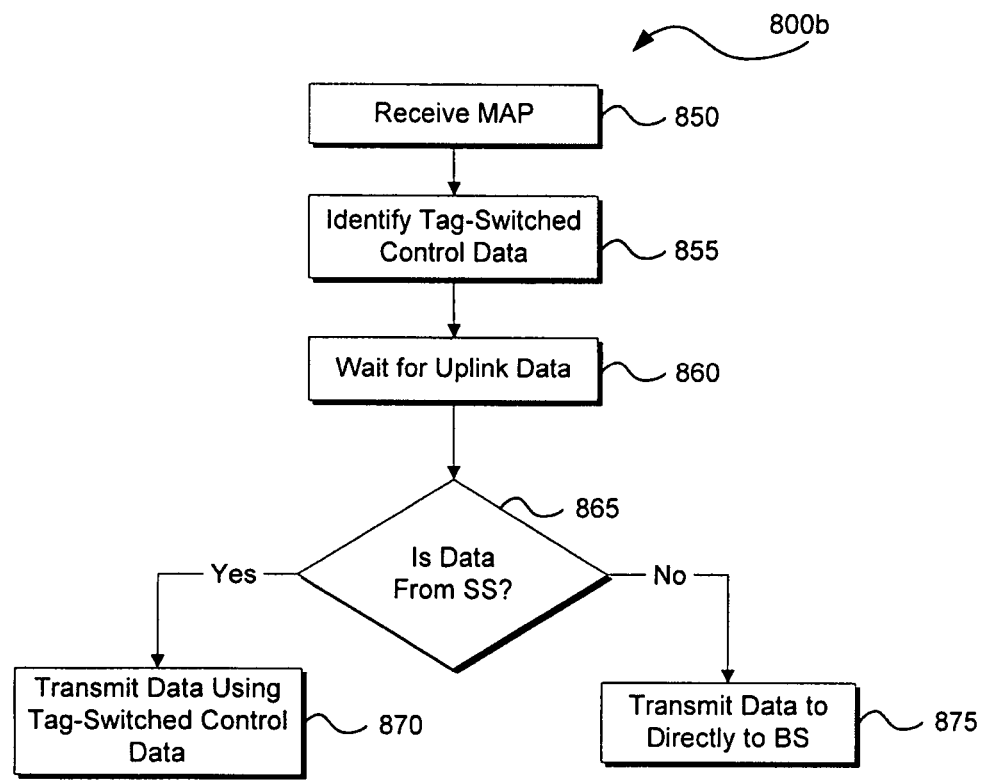
FIG. 8b is a flow chart illustrating an exemplary RS Uplink processing, consistent with certain disclosed embodiments.

FIG. 8b is an exemplary flow chart 800b illustrating processing of an uplink communication received by RS 420 from SS 430. RS 420 may receive a MAP message from BS 410 (step 850). RS 420 may identify the control data (step 855), and wait for uplink data from SS 430 or a subordinate RS 420 (step 860). If the uplink data is from SS 430 (step 865, Yes), RS 420 may transmit the data received from SS 430 to BS 410 using the tag-switched control data (step 870). If the data is not from SS 430 (step 865, No), RS 420 may transfer the received data directly to BS 410 (step 875).

Figure 9:
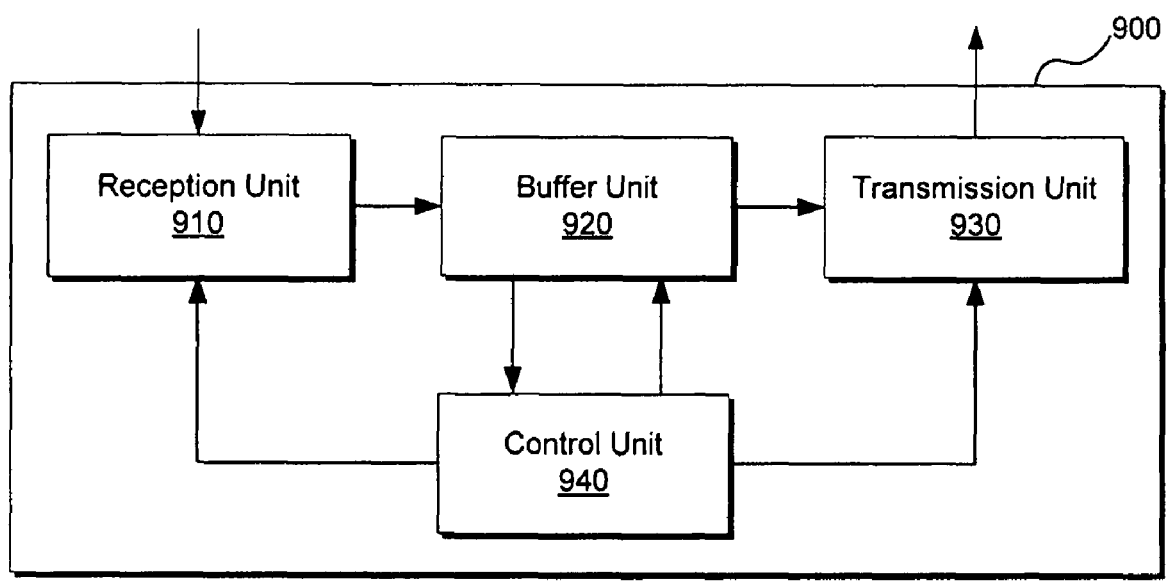
FIG. 9 is a block diagram illustrating an exemplary RS architecture, consistent with certain disclosed embodiments.

FIG. 9 is a block diagram of an exemplary architecture 900 of RS 420, consistent with certain disclosed embodiments. Architecture 900 may include a reception unit 910, a buffer unit 920, a transmission unit 930, and a control unit 940. Reception unit 910 may be configured to receive data from one or more BSs 410, SSs 430, and other RSs 420, and may be configured to process the received data. Buffer unit 920 may be configured to buffer the data processed by reception unit 910. For example, buffer unit 920 may identify the data, modify the data, etc. Control unit 940 may be configured to determine if incoming data includes packet data or control data, i.e., MAP message. If the incoming data is packet data, control unit 940 may be configured to perform one or more processes including, for example, retransmission, fragmentation, packing, etc. If the incoming data is a MAP message, control unit 940 may be configured to modify the control data. In addition, control unit 940 may be configured to determine one or more parameters for reception unit 910 and transmission unit 930. Transmission unit 930 may be configured to perform pre-processing on data sent from buffer unit 920 based on one or more parameters determined by control unit 940. Transmission unit 930 may also be configured to transmit data to one or more BSs 410, SSs 430, and other RSs 420.

Figure 10:
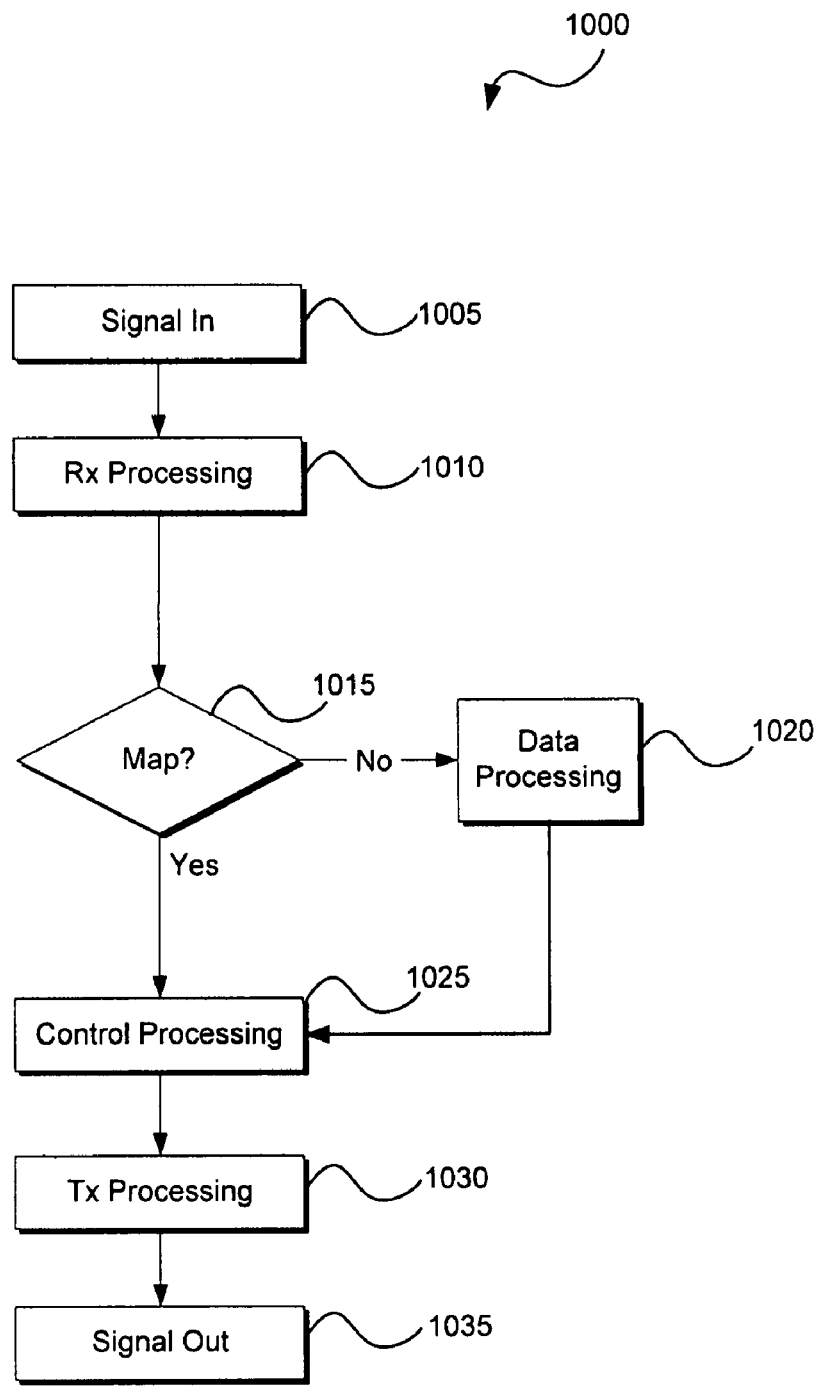
FIG. 10 is a flow chart illustrating an exemplary processing with RS architecture, consistent with certain disclosed embodiments.

FIG. 10 is a flow chart 1000 of exemplary processing by RS 420 using architecture 900, consistent with certain disclosed embodiments. Data sent from one or more BSs 410, SSs 430, and other RSs 420 may be received by reception unit 910 of RS 420 (step 1005). Reception unit 910 may perform processing on the received data (step 1010). Processing may include, for example, decoding, demodulation, translating analog radio signals to digital radio signals, etc.

Based on information provided by the reception unit 910, control unit 940 may determine if the received data is a MAP message (step 1015). If the received data is a MAP message (step 1015, Yes), control unit 940 may identify one or more control data in the MAP, e.g., MAP IEs. Control unit 940 may determine if the control data is intended for itself or if the control data is to be relayed to another RS 420 or on to BS 410 (step 1025). If the control data is intended for the current RS 420, control unit 940 may configure reception unit 910 to receive the following data burst in a defined time slot and sub-channel according to the transmission parameters contained in the connection-switched control data. If the control unit 940 determines that the control data is not intended for itself, control unit 940 may look up the tag information in RS tag table 450 to determine the next node in the transmission path. In addition, control unit 940 may determine one or more transmission parameters, and forward the control data to transmission unit 930. Transmission unit 930 may perform pre-processing on the received control data (step 1030), and transmit the data according to the transmission parameters determined by control unit 940 (step 1035).

If the received data is not control data (step 1015, No), control unit 940 may perform data processing (step 1020). For example, control unit 940 of the receiving RS 420 may configure the transmission unit 930 to forward the burst to the next node without further processing. If the received data is packet data and intended for the receiving RS 420, control unit 940 may decode the control data embedded in the burst and/or configured during connection setup. Control unit 940 may also configure transmission unit 930 to transmit the related connection-switched control data and packet data for one or more SSs 430 within its coverage in the indicated time slot and sub-channel (step 1025), and forward the data to transmission unit 930. Transmission unit 930 may perform pre-processing on the received control data (step 1030), and transmit the data according to the transmission parameters determined by control unit 940 (step 1035).

Figure 11:
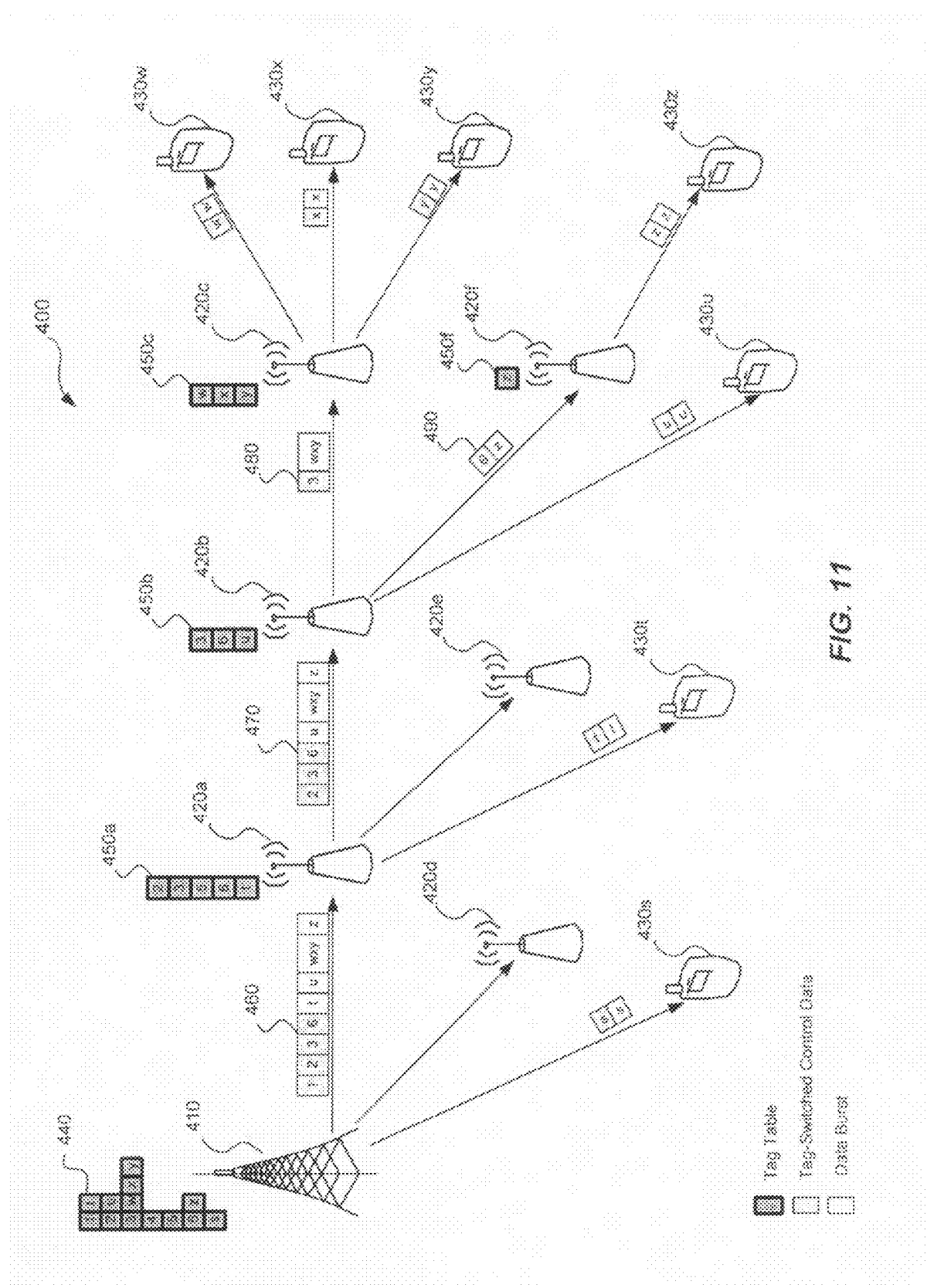
FIG. 11 is a system diagram illustrating exemplary data processing in a network, consistent with certain disclosed embodiments.

FIG. 11 is a diagram illustrating an exemplary communication from BS 110 in tag-switched network 400. As shown in FIG. 11, network 400 has been expanded to include RSs 420*d*, 420*e*, and 420*f*, and SSs 430*s*, 430*t*, 430*u*, and 430*z*. In one exemplary embodiment, BS 110 may store one or more BS tag tables 440. The one or more BS tag tables 440 may include data associated with one or more relay nodes, one or more transmission paths, and/or one or more transmission path identifiers. As shown in FIG. 11, BS tag table 440 may identify six transmission paths, transmission path 1 (i.e., the transmission path from BS 410 to RS 420*a*), transmission path 2 (i.e., the transmission path from BS 410 to RS 420*b*), transmission path 3 (i.e., the transmission path from BS 410 to RS 420*c*), transmission path 4 (i.e., the transmission path from BS 410 to RS 420*d*), transmission path 5 (i.e., the transmission path from BS 410 to RS 420*e*), and transmission path 6 (i.e., the transmission path from BS 410 to RS 420*f*).

In addition, BS tag table 440 may identify relationships between one or more transmission paths and one or more SSs 430. For example, BS tag table 440 may identify SS 430*t* (i.e., "t") as communicating by means of transmission path 1, SS 430*u* (i.e., "u") as communicating by means of transmission path 2, SSs 430*w*, 430*x* and 430*y* (i.e., "w," "x," and "y") as communicating by means of transmission path 3, and SS 430*z* (i.e., "z") as communicating by means of transmission path 6. In addition, BS tag table 440 may indicate that SS 430*s* is communicating by means of BS 410. While BS tag table 440 shows no duplication or overlap of service provided to SSs 430, it is possible that a single SS 430 may receive service by means of more than one transmission path. For example, SS 430*y* may receive service from RS 420*c* and RS 420*f*, thus SS 430*y* may be associated with the transmission paths to RS 420*c* and RS 420*f*. As represented in FIG. 11, "y" would appear not only in the same row as "3," as shown in BS tag table 440, but also in the same row as "6" (not shown).

In one exemplary embodiment, each RS 420 may store one or more RS tag tables 450. Because RS 420*a* is the dominant RS 420 for RS 420*b*, RS 420*c*, RS 420*e*, and RS 420*f*, and thus is in the transmission path to each of those subordinate RSs 420, RS tag table 450*a* may, for example, identify four transmission paths: transmission path 2 (i.e., the transmission path to RS 420*b*), transmission path 3 (i.e., the transmission path to RS 420*c*), transmission path 5 (i.e., the transmission path to RS 420*e*), and transmission path 6 (i.e., the transmission path to RS 420*f*). In addition, RS tag table 450*a* may indicate that SS 430*t* is serviced by RS 420*a*. Because RS 420*b* is the dominant RS 420 for RS 420*c* and RS 420*f*, and thus is in the transmission path to each of it subordinate RSs 420, RS tag table 450*b* may identify two transmission paths: transmission path 3 (i.e., the transmission path to RS 420*c*) and transmission path 6 (i.e., the transmission path to RS 420*f*). In addition, RS tag table 450*b* may indicate that SS 430*u* is serviced by RS 420*b*. RS tag table 450*c* of RS 420*c* may contain no transmission path information because RS 420*c* has no subordinate RSs 420. However, RS tag table 450*c* may indicate that SS 430*w*, SS 430*x*, and SS 430*y* are serviced by RS 420*c*. Similarly, RS tag table 450*f* of RS 420*f* may contain no transmission path information because RS 420*f* has no subordinate RSs 420. However, RS tag table 450*f* may indicate that SS 430*z* is serviced by RS 420*f*. RS 420*d* and RS 420*e* may have no RS tag tables 450 or may have no data in their RS tag tables 450 because RS 420*d* and RS 420*e* have no subordinate RSs 420 and do not provide service to any SSs 430.

In the example of FIG. 11, BS 410 may receive data for SS 430*s*, SS 430*t*, SS 430*u*, SS 430*w*, SS 430*x*, SS 430*y*, and SS 430*z*. BS 410 may access BS tag table 440 to determine transmission paths for each SS 430, and may generate a tag-switched MAP IE for each transmission path. In addition, BS 410 may generate a connection-switched control data for each SS 430 receiving data. BS 410 may place the connection-switched control data in a data burst area, and may place the associated tag-switched control data in frame MAP IE slots, the MAC header, or both. For example, referring to a data frame 460 between BS 410 and RS 420*a*, BS 410 may send a frame containing four tag-switched control data, each tag-switched control data associated with a data burst area of the frame. That is, tag-switched control data 1 may correspond to data burst area t, tag-switched control data 2 may correspond to data burst area u, tag-switched control data 3 may correspond to data burst area wxy, and tag-switched control data 6 may correspond to data burst area z. Once BS 410 has completed processing the frame, BS 410 may transmit the frame to the next node in the transmission path, i.e., RS 420*a*.

RS 420*a* may receive data frame 460 and may process each tag-switched control data. In this example, data frame 460 may contain four tag-switched control data. RS 420*a* may determine that the tag contained in tag-switched control data 1 identifies RS 420*a*, and RS 420*a* may decode the connection-switched control data in data burst area t. RS 420*a* may transmit the associated data, also contained in data burst area t, to SS 430*t* according to the connection-switched control data parameters.

RS 420*a* may determine that tag-switched control data 2, 3, and 6 are not intended for RS 420*a*, and RS 420*a* may access RS tag table 450*a* using the tags found in the tag-switched control data to determine the next node in the transmission path for each one. In this example, RS 420*a* may determine that RS 420*b* is the next node, and RS 420*a* may forward the remaining frame data to RS 420*b* as a data frame 470. If, however, RS 420*a* determines that the next node is not in the transmission path of RS 420*a*, RS 420*a* may drop the frame. For example, RS 420*a* may forward data to RS 420*b* and RS 420*e*, and drop data destined for RS 420*d*.

RS 420*b* may receive data frame 470 and may process each tag-switched control data. In this example, data frame 470 may contain three tag-switched control data. RS 420*b* may determine that the tag contained in tag-switched control data 2 identifies RS 420*b*, and RS 420*b* may decode the connection-switched control data in corresponding data burst area u. RS 420*b* may transmit the associated data, also contained in data burst area u, to SS 430*u* according to the connection-switched control data parameters.

RS 420*b* may determine that frame control data 3 and 6 are not intended for RS 420*b*, and RS 420*b* may access RS tag table 450*b* using the tags found in the tag-switched control data to determine the next node in the transmission path. In this example, RS 420*b* may determine that RS 420*c* is the next node for the frame data corresponding to control data 3, and RS 420*f* is the next node for the frame data corresponding to control data 6. RS 420*b* may forward the frame data corresponding to control data 3 to RS 420*c* as a data frame 480, and may forward the frame data corresponding to control data 6 to RS 420*f* as a data frame 490. If, however, RS 420*b* determines that the next node is not in the transmission path of RS 420*b*, RS 420*b* may drop the frame. For example, RS 420*b* may forward data to RS 420*c* and RS 420*f*, and drop data destined for RS 420*d* and RS 420*e*.

RS 420*c* may receive data frame 480 and may process each tag-switched control data. In this example, data frame 480 may contain only one tag-switched control data. RS 420*c* may determine that the tag contained in tag-switched control data 3 identifies RS 420*c*, and RS 420*c* may decode the connection-switched control data in data burst area wxy. RS 420*c* may transmit the associated data, also contained in data burst area wxy, to SS 430*w*, SS 430*x*, and SS 430*y* according to the connection-switched control data parameters for each SS 430.

Similarly, RS 420*f* may receive data frame 490 and process each tag-switched control data. In this example, data frame 490 may contain only one tag-switched control data. RS 420*f* may determine that the tag contained in the tag-switched control data 6 identifies RS 420*f*, and RS 420*f* may decode the connection-switched control data in data burst area z. RS 420*f* may transmit the associated data, also contained in data burst area z, to SS 430*z* according to the connection-switched control data.

In this manner, network 400 may transmit and receive data using one or more relay nodes by replacing one or more connection-switched control data with one or more tag-switched control data.

Although the disclosed embodiments show a tag-switched network based on the IEEE 802.16 family of standards, the disclosed embodiments may be implemented within any network utilizing one or more network nodes, which may be configured to transmit or retransmit data to one or more other network nodes. The disclosed embodiments may achieve improved performance. In particular, the disclosed embodiments may provide a simplified network node architecture, improve management of wireless communication connections, increase the speed of packet switch processing, and improve resource utilization.

It will be apparent to those skilled in the art that various modifications and variations can be made in the system and method for tag-switched wireless transmission. It is intended that the standard and examples be considered as exemplary only, with a true scope of the disclosed embodiments being indicated by the following claims and their equivalents.

What is claimed is:

1. A method for processing wireless data in a multi-hop relay-based wireless communication network, the multi-hop relay-based wireless communication network including a plurality of intermediary nodes and a plurality of destination devices, the method comprising:

determining at least one transmission path to each of the plurality of intermediary nodes, wherein the at least one transmission path includes data associated with every intermediary node along the at least one transmission path;

determining a transmission path identifier for each of the at least one transmission paths, wherein the transmission path identifier is a destination node identifier; and sending transmission data to at least one destination device of the plurality of destination devices, wherein the transmission data is sent based on at least one of the transmission path identifiers, the transmission data including the transmission path identifier, the transmission path identifier including information identifying a location for at least one destination node, wherein the transmission path identifier does not include information identifying a location of the intermediary node.

2. The method as in claim 1, further including:

sending at least one data frame to at least one of the plurality of intermediary nodes, wherein the at least one data frame includes the transmission data and the at least one transmission path identifier.

3. The method as in claim 1, further including:

storing the at least one transmission path and transmission path identifier.

4. The method as in claim 2, wherein the at least one of the transmission path identifiers is included in a control data of the at least one data frame.

5. The method as in claim 4, wherein the control data of the at least one data frame includes at least one MAP-Information Element (MAP IE).

6. The method as in claim 4, wherein the control data is included in a MAP message, and the MAP message is a Downlink (DL) MAP message.

7. The method as in claim 4, wherein the control data is included in a MAP message, and the MAP message is an Uplink (UL) MAP message.

8. The method as in claim 2, wherein the transmission data is included in a data burst area of the at least one data frame.

9. The method as in claim 8, wherein at least one connection identifier is included in the data burst area of the at least one data frame.

10. The method as in claim 1, wherein determining the transmission path identifier includes determining the transmission path identifier when the wireless communication network is established.

11. The method as in claim 1, wherein determining the transmission path identifier includes determining the transmission path identifier when at least one of the plurality of intermediary nodes and one of the plurality of destination devices joins the wireless communication network.

12. The method as in claim 1, wherein determining the transmission path identifier includes determining the transmission path identifier when at least one of the plurality of intermediary nodes and one of the plurality of destination devices leaves the wireless communication network.

13. The method as in claim 1, wherein each of the plurality of intermediary nodes is included in at least one transmission path, the method further including:

providing, to each of the plurality of intermediary nodes, the transmission path and the transmission path identifier for each transmission path of the at least one transmission path in which each intermediary node is included.

14. The method as in claim 1, wherein the wireless communication network further includes at least one control node.

15. The method as in claim 14, wherein the at least one control node is a base station.

16. The method as in claim 14, wherein the at least one control node is a relay station.

17. The method as in claim 1, wherein the plurality of intermediary nodes includes a plurality of relay stations.

18. The method as in claim 1, wherein the destination node identifier identifies at least one destination intermediary node of the plurality of intermediary nodes.

19. A wireless communication station for wireless communication in a multi-hop relay-based wireless communication network, the multi-hop relay-based wireless communication network including a plurality of intermediary nodes and a plurality of destination devices, the wireless communication station comprising:
at least one memory to store data and instructions; and
at least one processor configured to access the memory and, when executing the instructions, configured to:
determine at least one transmission path to each of the plurality of intermediary nodes, wherein the at least one transmission path includes data associated with every intermediary node along the at least one transmission path;
determine a transmission path identifier for each of the at least one transmission paths, wherein the transmission path identifier is a destination node identifier; and
send transmission data to at least one destination device of the plurality of destination devices, wherein the transmission data is sent based on at least one of the transmission path identifiers, the transmission data including the transmission path identifier, the transmission path identifier including information identifying a location for at least one destination node, wherein the transmission path identifier does not include information identifying a location of the intermediary node.

20. The wireless communication station as in claim 19, wherein the at least one processor is further configured to:
send at least one data frame to at least one of the plurality of intermediary nodes, wherein the at least one data frame includes the transmission data and the at least one transmission path identifier.

21. The wireless communication station as in claim 19, wherein the at least one processor is further configured to:
store the at least one transmission path and transmission path identifier.

22. The wireless communication station as in claim 20, wherein the at least one of the transmission path identifiers is included in a control data of the at least one data frame.

23. The wireless communication station as in claim 22, wherein the control data of the at least one data frame includes at least one MAP-Information Element (MAP IE).

24. The wireless communication station as in claim 22, wherein the control data is included in a MAP message, and the MAP message is a Downlink (DL) MAP message.

25. The wireless communication station as in claim 22, wherein the control data is included in a MAP message, and the MAP message is an Uplink (UL) MAP message.

26. The wireless communication station as in claim 20, wherein the transmission data is included in a data burst area of the at least one data frame.

27. The wireless communication station as in claim 26, wherein at least one connection identifier is included in the data burst area of the at least one data frame.

28. The wireless communication station as in claim 19, wherein to determine the transmission path identifier includes determining the transmission path identifier when the wireless communication network is established.

29. The wireless communication station as in claim 19, wherein to determine the transmission path identifier includes determining the transmission path identifier when at least one of the plurality of intermediary nodes and one of the plurality of destination devices joins the wireless communication network.

30. The wireless communication station as in claim 19, wherein to determine the transmission path identifier includes determining the transmission path identifier when at least one of the plurality of intermediary nodes and one of the plurality of destination devices leaves the wireless communication network.

31. The wireless communication station as in claim 19, wherein each of the plurality of intermediary nodes is included in at least one transmission path, the at least one processor is further configured to:
provide, to each of the plurality of intermediary nodes, the transmission path and the transmission path identifier for each transmission path of the at least one transmission path in which each intermediary node is included.

32. The wireless communication station as in claim 19, wherein the wireless communication station is a control node.

33. The wireless communication station as in claim 32, wherein the control node is a base station.

34. The wireless communication station as in claim 32, wherein the control node is a relay station.

35. The wireless communication station as in claim 19, wherein the wireless communication station is an intermediary node.

36. The wireless communication station as in claim 35, wherein the intermediary node is a relay station.

37. The wireless communication station as in claim 19, wherein the destination node identifier identifies at least one destination intermediary node of the plurality of intermediary nodes.

* * * * *